J. E. TICHON.
FAUCET.
APPLICATION FILED JULY 10, 1911.
1,019,380.
Patented Mar. 5, 1912.
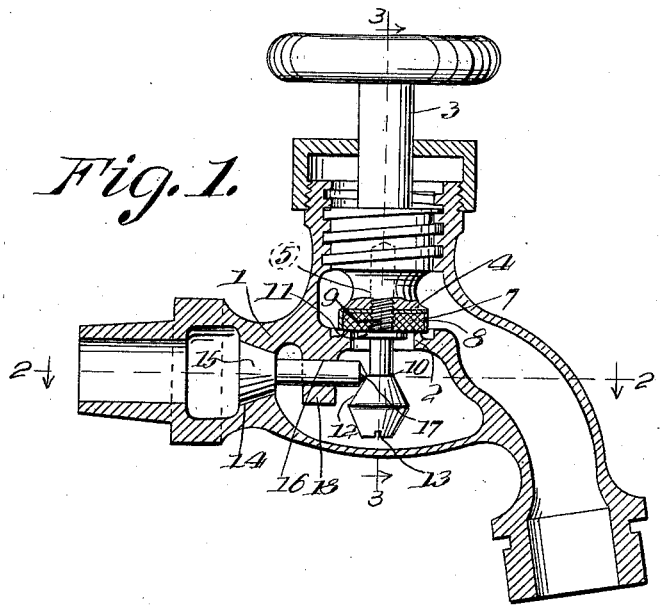
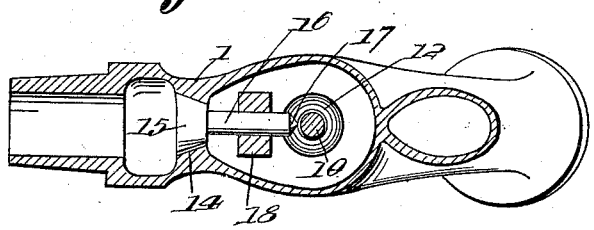
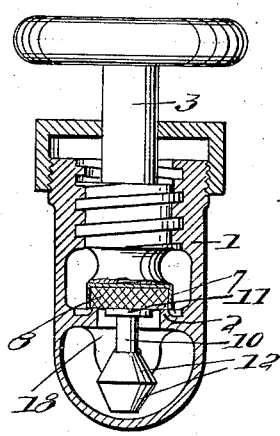

UNITED STATES PATENT OFFICE.

JOSEPH E. TICHON, OF NEW BEDFORD, MASSACHUSETTS, ASSIGNOR TO ROBERT GRIEVE, OF PROVIDENCE, RHODE ISLAND.

FAUCET.

1,019,380.  Specification of Letters Patent.  Patented Mar. 5, 1912.

Application filed July 10, 1911. Serial No. 637,818.

*To all whom it may concern:*

Be it known that I, JOSEPH E. TICHON, a citizen of the United States, residing at New Bedford, in the county of Bristol and State of Massachusetts, have invented a new and useful Improvement in Faucets, of which the following is a specification.

This invention relates to certain new and useful improvements in faucets.

The object of the invention is to provide a novel faucet so constructed that the valve spindle and packing may be removed for the purpose of supplying a new packing or otherwise repairing or replacing the parts.

Further, the invention aims to provide a simple, inexpensive, and efficient faucet which will accomplish the object above set forth.

In the drawings: Figure 1 is a vertical sectional view of a faucet constructed in accordance with the present invention. Fig. 2 is a section on the line 2—2 of Fig. 1. Fig. 3 is a similar view on the line 3—3 of Fig. 1.

The valve body 1 is formed with the usual horizontal valve seat 2, the valve spindle 3 having a square lower face 4 and a threaded socket 5.

7 designates a cup on the interior of which packing 8 is arranged, the cup 7 abutting the square face 4 and together with the packing 8 is formed with an opening through which the threaded stem 9 of an auxiliary valve operating member 10 is passed. The stem of the auxiliary valve operating member 10 is formed with a collar 11 which abuts the packing 8 and not only holds the latter in cup 7 but also holds the cup 7 against the face 4 of the valve spindle 3. The shank of the auxiliary valve operating member 10 is provided with a head which has two annular operatively beveled faces 12 the lower end of the head being formed with a slot 13 to receive a screw driver whereby the head may be rigidly secured to spindle 3.

14 designates a vertical auxiliary valve seat which is located to the rear of the valve seat 2. An auxiliary valve 15 engages in the auxiliary seat and has a stem 16 which is formed with a cone pointed end 17. A depending web 18 is formed integral with the body 1 and is located between valve seats 2 and 14 and is perforated to receive the stem 16 of auxiliary valve 15.

As depicted in Fig. 1 of the drawings when the pressure of the water causes valve 15 to be seated, the pointed end 17 of the stem 16 thereof is in engagement with the upper beveled face of the head of the auxiliary valve operating member 10. It will thus be seen that when the spindle 3 is rotated to lift the packing 8 from the seat 2, that the upper beveled face 12 will ride against the cone pointed end 17 of the auxiliary valve and force the latter from its seat, permitting the water to enter the body and to pass through the same. When it is desired to remove the spindle 3 and its associated parts for any purpose, the latter is rotated so as to entirely withdraw the same from the body, and it will be noted that the pressure of the water against valve 15 will cause the latter to seat and prevent any water from entering the body.

Having thus described my invention, I claim as new and desire to secure by Letters Patent:—

1. In combination with a valve body having a horizontal seat, a spindle having a square lower face and a threaded socket, a cup having its bottom engaging the said face and having packing therein, an auxiliary vertical valve seat to the rear of the first named valve seat, a valve in said vertical valve seat having a stem which is horizontally disposed and formed with a cone-shaped free end, and a member for operating said stem consisting of a head part having oppositely beveled annular faces to engage said cone shaped end of the stem, a stem carried by said head and having a threaded end which engages in said socket of the spindle, and a collar on said second stem which abuts the packing.

2. In a faucet, in combination with a rotatable and reciprocating valve, a sliding auxiliary valve, and a head carried by the first mentioned valve and formed with oppositely beveled annular faces to engage the sliding valve to move same to open position.

3. In a faucet, in combination with a main valve, an auxiliary valve, and a head carried by the main valve and formed with oppositely beveled annular faces to engage with the auxiliary valve.

4. In a faucet, in combination with a casing and a main valve therein, an auxiliary valve having a stem, a head carried by the main valve and having a cone-shaped part engaging the stem of the auxiliary valve whereby when the main valve is moved outwardly the auxiliary valve will be unseated, said head being further formed with a second cone-shaped part the base of which contacts with the base of the first named cone-shaped part so that when the main valve is introduced into the casing the second named cone-shaped part engages said stem of the auxiliary valve and unseats the auxiliary valve so as to permit the base of the first named cone-shaped part to extend to a point beyond the stem of the auxiliary valve.

In testimony whereof I have signed my name to this application in the presence of two subscribing witnesses.

JOSEPH E. TICHON.

Witnesses:
FRED. G. SMILEY,
MARGARET M. HUMPHREY.